United States Patent

Kurosu et al.

[11] Patent Number: 5,117,932
[45] Date of Patent: Jun. 2, 1992

[54] PROTECTING DEVICE FOR AN ELECTRONIC CONTROL UNIT OF A SNOWMOBILE

[75] Inventors: Shinichi Kurosu, Ageo; Mitsugi Chonan, Koga; Fusao Tachibana, Shiraoka; Kazuo Suzuki, Ageo; Yoshiki Yuzuriha, Isezaki, all of Japan

[73] Assignees: Fuji Jukogyo Kabushiki Kaisha, Tokyo; Japan Electronic Control Systems Co., Ltd., Gunma, both of Japan

[21] Appl. No.: 603,273

[22] Filed: Oct. 25, 1990

[51] Int. Cl.$^5$ .............................. B60K 11/06
[52] U.S. Cl. ................... 180/68.2; 180/68.3; 180/182; 440/77; 55/DIG. 28; 123/198 E
[58] Field of Search ............ 180/68.1, 68.2, 68.3, 180/69.4, 182, 183, 184, 185; 55/DIG. 28, 276, 318, 319, 385.3; 123/146.5 A, 198 E, 198 R; 440/77

[56] References Cited

U.S. PATENT DOCUMENTS

| | | | |
|---|---|---|---|
| 3,688,856 | 9/1972 | Boehm et al. | 180/182 |
| 3,996,914 | 12/1976 | Crall et al. | 55/DIG. 28 |
| 4,006,724 | 2/1977 | Carter et al. | 55/DIG. 28 |
| 4,008,777 | 2/1977 | Juto et al. | 180/182 |
| 4,155,414 | 5/1979 | Fujikawa et al. | 180/68.3 |
| 4,249,626 | 2/1981 | Fields et al. | 180/182 |

FOREIGN PATENT DOCUMENTS 63-45359  9/1988  Japan .

Primary Examiner—Andres Kashnikow
Assistant Examiner—Richard Camby
Attorney, Agent, or Firm—Martin A. Farber

[57] ABSTRACT

A snowmobile has an upper hood having a plurality of air intakes, an engine provided downstream of the air intakes, and an air box having an air cleaner and communicating with an inlet port of the engine. An electronic control unit is disposed in a case which is secured to an upper wall of the air box. A deflector is disposed between the air intakes and the case so as to deflect intake air from the case.

8 Claims, 4 Drawing Sheets

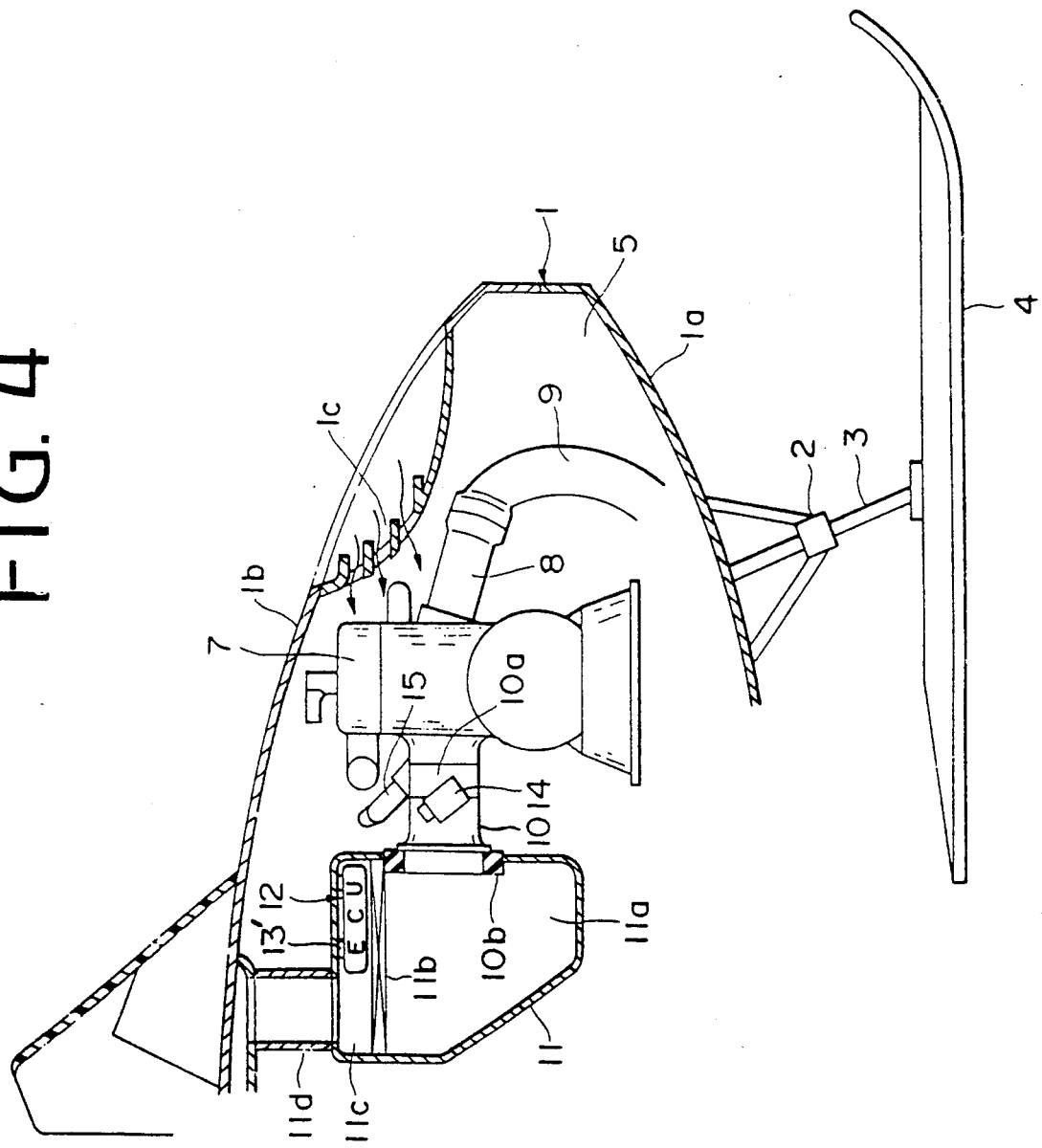

5,117,932

PROTECTING DEVICE FOR AN ELECTRONIC CONTROL UNIT OF A SNOWMOBILE

BACKGROUND OF THE INVENTION

The present invention relates to a snowmobile, and more particularly to a device for protecting an electronic control unit from snow, water etc.

A recent snowmobile has been equipped with an electronic control system for controlling an engine. For example, in order to control the air-fuel ratio of a mixture for the engine, the fuel injection quantity is determined based on throttle valve opening degree $\alpha$ and engine speed N. A fuel injection pulse width for injecting fuel corresponding to the fuel injection quantity is calculated by an electronic control unit.

It is necessary to dispose the control unit in the snowmobile so as to protect the control unit from snow, rainwater and vibration of the engine. Furthermore, the control unit is provided to calculate the fuel injection pulse width based on output signals from sensors provided on the engine. Thus, it is desirable to locate the control unit near the engine, namely in an engine room.

Japanese Patent Publication 63-45359 discloses a snowmobile in which an engine room is formed in a front hood. An intake of air is formed on the front hood to take cold wind into the engine room to cool heat generating portions of the engine such as a muffler and an exhaust manifold, thereby preventing the fuel in a fuel pipe from vaporizing.

In such a snowmobile, snow and rainwater enter in the engine room together with the cold wind. If an electronic control unit is mounted in the engine room, the snow or the rainwater tend to stick to an outer wall of a case of the control unit.

Generally, the cover of the case and a body thereof are joined with each other through a packing for sealing therebetween. If the case is repeatedly heated by radiant heat and cooled by the atmosphere after stopping of the engine, the case breathes in accordance with the thermal expansion of the case. Thus, the water sticking on the outside of the case may enter the inside of the case. As a result, the drops of water adhere to a circuit board on which a CPU is mounted, causing malfunctioning of the control unit.

In order to solve these problems, the layout of the intake of air is changed to prevent snow and water from sticking to the case, or an additional cover is provided to cover the case to prevent the influence of the radiant heat.

However, the change of the air intake causes a reduction of the cooling efficiency of the engine room. The additional cover must be removed and attached at every maintenance and inspection operation of the control unit, which complicates the operation.

If the control unit is disposed adjacent the engine, the control unit is vibrated by the engine, causing erroneous operation of the control unit.

SUMMARY OF THE INVENTION

An object of the present invention is to provide a protecting device for the control unit in the snowmobile which may protect the electronic control unit from snow, rainwater, and vibration of the engine without changing the layout of the air intake for the engine.

Another object of the present invention is to provide a protecting device in which the control unit may be easily inspected.

According to the present invention, there is provided a protecting device for an electronic control unit of a snowmobile having an upper hood having a plurality of air intakes and defining an engine room, an engine provided in the engine room downstream of the air intakes, and an air box having an air cleaner and communicating with an inlet port of the engine, characterized by a case containing the electronic control unit therein and disposed between an upper wall of the air box and the upper hood, and a deflector disposed between the air intakes and the case so as to deflect intake air from the case.

In an aspect of the invention, the case is secured to an upper wall of the air box and the deflector is secured to an underside of the upper hood. The air box is connected to the engine through dampers. The deflector may be bent at a central portion thereof so as to deflect the intake air in opposite side direction.

Other objects and features of this invention will become understood from the following description with reference to the accompanying drawings.

BRIEF DESCRIPTION OF THE DRAWINGS

FIG. 4 is a sectional side view showing a third embodiment.

DETAILED DESCRIPTION OF THE PREFERRED EMBODIMENTS

Figure 1:
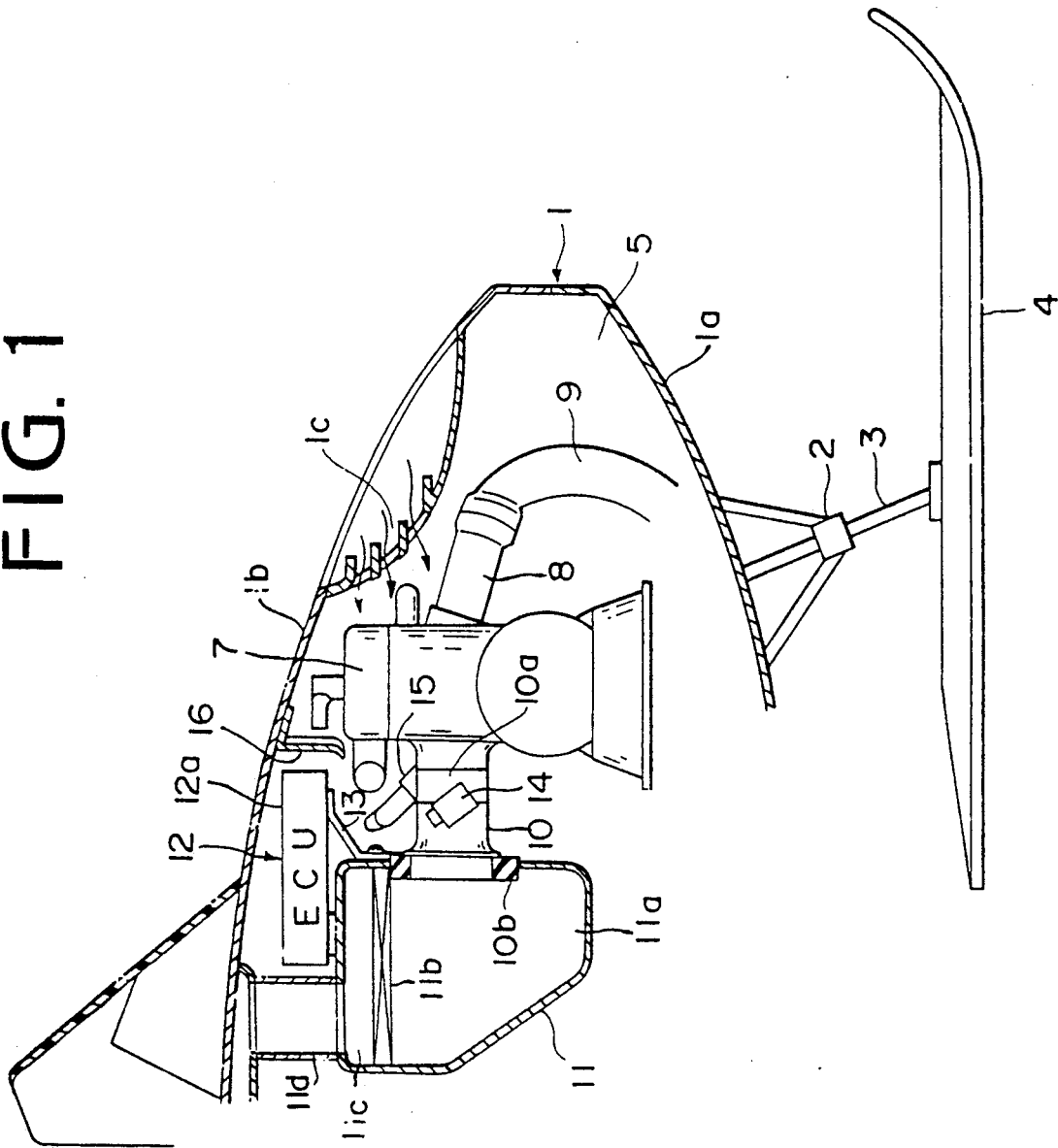
FIG. 1 is a sectional side view showing a main part of a snowmobile having a protecting device according to the present invention.
Figure 2:
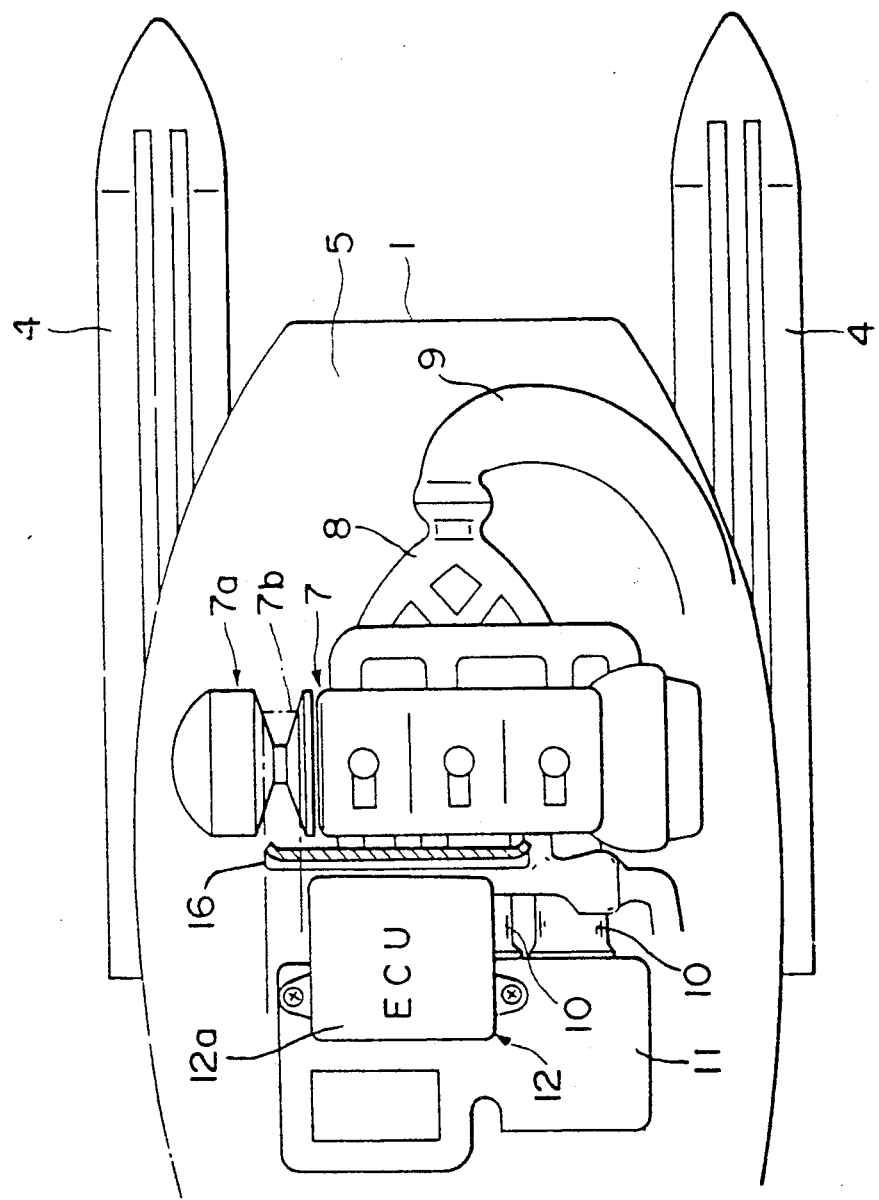
FIG. 2 is a sectional plan view of the snowmobile.

Referring to FIGS. 1 and 2, the snowmobile comprises a front hood 1 having a lower hood 1a secured to a frame of a snowmobile body (not shown) and an upper hood 1b detachably mounted on the lower hood 1a. A pair of steering links 2 are secured to the underside of the lower hood 1a on the opposite sides thereof. A suspension arm 3 is downwardly projected from the steering link 2 for supporting a ski 4.

In the front hood 1, an engine room 5 is formed. The upper hood 1b has a plurality of air intakes (louvers) 1c in the front portion thereof for the atmosphere to enter engine room 5.

An engine 7 is laterally mounted in the engine room 5. The engine 7 has an output shaft on which a drive pulley 7a for a continuously variable transmission is mounted. The drive pulley 7a is operatively connected to a crawler (not shown) through a belt 7b and a driven pulley of the continuously variable transmission (not shown).

An exhaust manifold 8 connected to an exhaust port of the engine extends toward the air intakes 1c. An exhaust pipe 9 is connected to the exhaust manifold 8 and extends to the rear portion passing under the air intakes 1c communicating with the atmosphere through a muffler (not shown).

A throttle body 10 of the engine 7 is connected to an intake port of each cylinder through a damper 10a made of rubber. An air box 11 is provided in the rear of the engine 7. The throttle body 10 is communicated with an expansion chamber 11a of the air box 11 through a damper 10b. An air cleaner 11b is mounted in the upper portion of the air box 11 so that an intake air chamber 11c is formed in the air box 11 separated from the expansion chamber 11a by the air cleaner 11b. The intake air chamber 11c is connected to an intake pipe 11d which opens to the rear portion of the front hood 1. Thus, a fresh air is supplied to the engine 7 through the intake pipe 11d, intake air chamber 11c, air cleaner 11b, expansion chamber 11, and throttle body 10.

On the air box 11, a waterproof case 12a containing an electronic control unit 12 is mounted by brackets 13. In front of the case 12a, a deflector 16 is secured to the inside wall of the upper hood 1b. The deflector 16 has an area larger than the front portion of the case 12a. Thus, the electronic control unit 12 in the case 12a is surrounded by the deflector 16, upper hood 1b and air box 11.

A throttle position sensor 14 is provided adjacent a throttle valve (not shown) in the throttle body 10 and produces a throttle valve opening degree signal $\alpha$ which is applied to the control unit 12. The control unit 12 detects the throttle opening degree $\alpha$ and width of CDI pulse and makes various calculations to determine the fuel injection pulse width for a fuel injector 15.

Describing the operation, when the engine 7 starts, the output power of the engine is transmitted to the crawler through the drive pulley 7a and the belt 7b to drive the snowmobile. The cooling air enters the engine room 5 through the air intakes 1c so that the exhaust manifold 8, exhaust pipe 9, muffler and the engine 7 are cooled. The air flows to the rear portion passing through the side and upper portions of the engine 7. The air is deflected from the control unit 12 by the deflector 16.

As aforementioned, the control unit 12 secured to the air box 11 at the rear of the deflector 16 is surrounded by the deflector 16, upper hood 1b and air box 11. Consequently, even if the snow or rainwater enters the engine room 5 together with the air, it does not stick to the case 12a. Therefore, the control unit 12 in the case 12a is effectively protected from the water.

The air box 11 is connected to the throttle body 10 through the damper 10b and in turn the throttle body 10 is connected to the engine 7 through the damper 10a. Thus, the vibration of the engine 7 is hardly transmitted to the air box 11, so that the control unit 12 mounted on the air box 11 is prevented from vibrating.

Furthermore, the deflector 16 is secured to the upper hood 1b. When the upper hood 1b is opened during inspection of the control unit 12, the deflector 16 is removed together with the upper hood 1b. Thus, the inspection can be easily performed.

Figure 3:
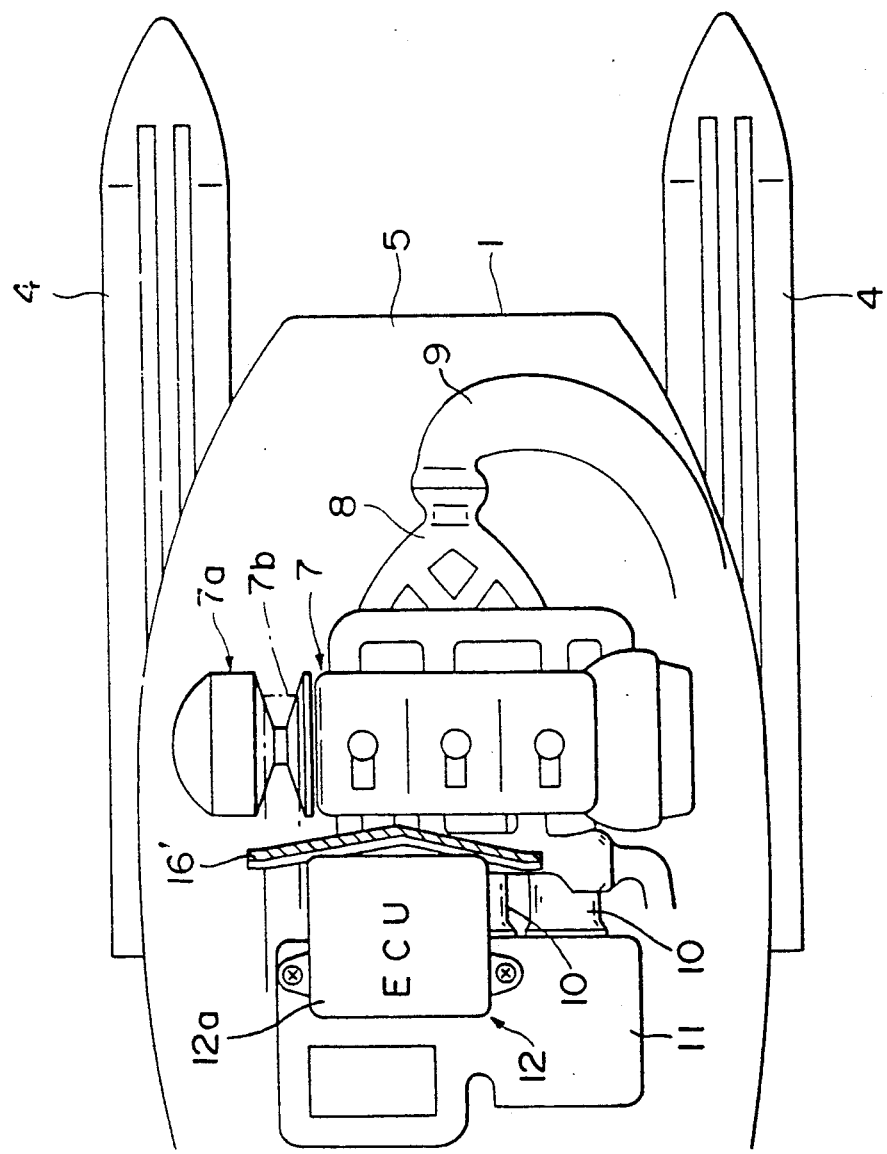
FIG. 3 is a sectional plan view showing a second embodiment of the present invention.

Referring to FIG. 3 showing the second embodiment, a deflector 16' is bent at the center thereof toward the rear. Thus, the air is outwardly deflected in the opposite side directions of the snowmobile by the deflector 16', thereby effectively preventing water from sticking to the case 12a.

Referring to FIG. 4 showing the third embodiment, the control unit 12 is provided in the intake air chamber 11c of the air box 11, secured to the upper wall of the air box 11 by brackets 13'. The control unit 12 is located in a portion away from the passing for intake air from the intake pipe 11d so as not to interfere with the intake air.

In the third embodiment, since the control unit 12 is mounted in the air box 11, the control unit is not only effectively protected from snow and raihwater, but the water sealing device of the case 12a is simplified in construction. Furthermore, the influence of vibration of the engine and radiant heat are reduced.

In accordance with the present invention, the control unit is effectively protected from snow and rainwater without changing the layout of the air intakes, so that an additional cover is not provided. Thus, the inspection of the control unit is easily performed. Since the vibration of the engine is damped through dampers, vibration transmitted to the control unit is reduced.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. A protecting device for an electronic control unit of a snowmobile having an upper hood having a plurality of air intakes and defining an engine room, an engine provided in the engine room downstream of the air intakes, and an air box having an air cleaner and communicating with an inlet port of the engine, comprising:
   a case containing said electronic control unit therein and secured to said air box and disposed between an upper wall of said air box and said upper hood; and
   a deflector secured in said engine room and disposed between said air intakes and said case so as to deflect intake air from the case.

2. The protecting device according to claim 1, wherein said case is secured to said upper wall of said air box.

3. The protecting device according to claim 1, wherein said upper hood is provided to be opened, and said deflector is secured to an underside of the upper hood.

4. The protecting device according to claim 1, wherein said air box is connected to said engine through dampers.

5. The protecting device according to claim 1, wherein
   said deflector is bent at a central portion thereof, extending from said central portion downstream, so as to deflect the intake air in opposite side directions of the snowmobile.

6. A protecting device for an electronic control unit of a snowmobile having an upper hood mounted on a body of the snowmobile and forming an engine room, an engine provided in the engine room and an air box containing an air cleaner communicating with an inlet port of the engine, comprising:
   air intake means provided on the upper hood at a front side of the engine room for taking intake air into the engine room to cool the engine;
   a case containing said electronic control unit therein and securely supported on said air box between said air box and said upper hood; and
   deflector means supported by the upper hod and disposed between said air intakes and said case for deflecting said intake air from the case so as to prevent said case from wetting.

7. The protecting device according to claim 6, wherein
   said deflector means has a convex portion for deflecting said intake air in opposite side directions of the snowmobile.

8. The protecting device according to claim 7, wherein
   said convex portion forms a bent shape.

* * * * *